US006183178B1

(12) United States Patent
Bateman

(10) Patent No.: US 6,183,178 B1
(45) Date of Patent: Feb. 6, 2001

(54) PUSH-ON TIE-DOWN ANCHOR

(75) Inventor: Brian Bateman, Rochester Hills, MI (US)

(73) Assignee: Polytech Netting, L.P., Troy, MI (US)

( * ) Notice: Under 35 U.S.C. 154(b), the term of this patent shall be extended for 0 days.

(21) Appl. No.: 09/330,908

(22) Filed: Jun. 11, 1999

(51) Int. Cl.$^7$ ...................................................... B60P 7/08
(52) U.S. Cl. ............................ 410/116; 410/106; 410/110
(58) Field of Search ................................... 410/101, 106, 410/110, 116; 24/265 C, 265 D, 129 R, 115 K; 248/499

(56) References Cited

U.S. PATENT DOCUMENTS

| | | | |
|---|---|---|---|
| 3,351,356 | * 11/1967 | Clark et al. | 410/116 X |
| 5,676,508 | * 10/1997 | Weicht | 410/101 |
| 5,738,471 | * 4/1998 | Zentner | 410/110 |
| 5,915,900 | * 6/1999 | Boltz | 410/110 |
| 6,030,160 | * 2/2000 | Moore | 410/118 |

* cited by examiner

Primary Examiner—Stephen T. Gordon
(74) Attorney, Agent, or Firm—Young & Basile, P.C.

(57) ABSTRACT

A tie-down anchor is secured to a threaded stud projecting from a surface inside an auto to provide a point of attachment for a flexible member such as a cord or loop of a cargo restraint net. The anchor has a tubular stem defining an axial through hole for receiving the stud, and a plurality of barbs extending radially inward into the through hole and angled along the axis of the through hole in the direction in which the stud is inserted. The anchor is pushed directly onto the stud, the barbs deflecting radially outward as the stud is inserted into the through hole. The tips of the barbs engage the threads in a ratcheting manner as the stud is inserted into the through hole. The angled barbs effectively prevent withdrawal from the through hole unless the anchor is rotated to unthread it from the stud. The through hole allows the anchor to be produced as a single, integral piece requiring no further assembly before it is installed in connection with a threaded stud. A plurality of axial ridges are formed about the circumference of the through hole and offset from the barbs to define an inside diameter approximately equal to the outside diameter of the stud. The ridges contact the outer surface of the stud along substantially the entire length of the stem to provide a secure and stable engagement between the components.

8 Claims, 2 Drawing Sheets

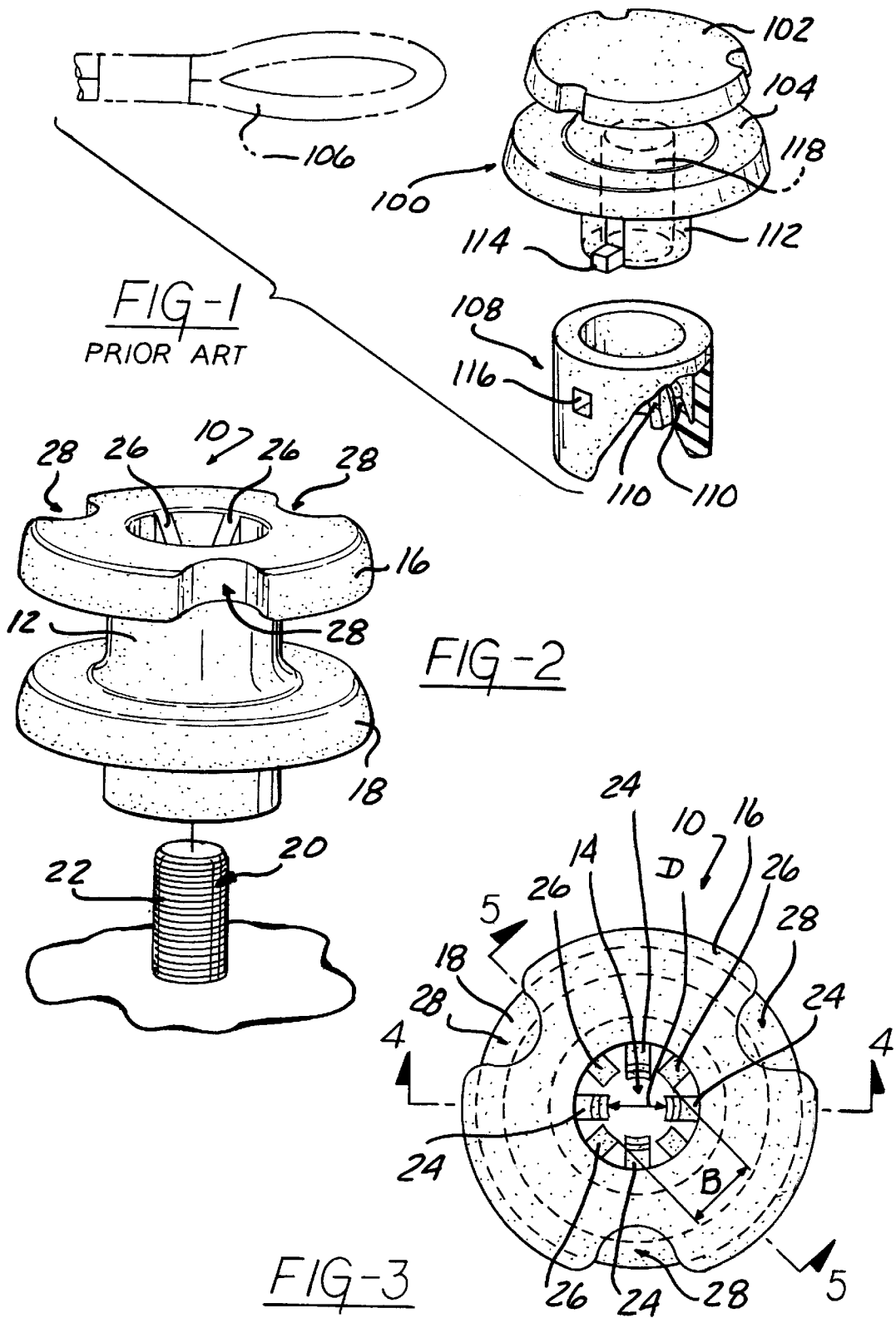

PUSH-ON TIE-DOWN ANCHOR

FIELD OF THE INVENTION

The present invention relates to anchors of the type used in automotive vehicles interiors to provide points of attachment items such as bungee cords or cargo restraint netting. More specifically, the invention relates to such an anchor that may be secured to a threaded stud in the vehicle interior by pushing the anchor straight onto the stud without any rotation, but which can only be removed from the stud by rotating it.

BACKGROUND OF THE INVENTION

It is known in the automotive vehicle industry to provide cargo storage and restraint compartments formed by attaching sections of netting to surfaces within the passenger and/or cargo areas of a vehicle. The netting is generally formed from elastic cords, non-elastic cords, or a combination thereof to create a compartment that is somewhat expandable if desired. For example, it is common to attach a non-elastic netting section to the left and right hand side walls of a vehicle's trunk or rear cargo area so that the net stretches across the area a short distance forward of the rear bumper. Objects such as grocery bags can then be placed behind the net barrier and are prevented from sliding or rolling forward when the vehicle is in motion.

It is known to secure a storage net to a vehicle at one or more points by forming loops in the net cord or an associated bungee cord and placing the loops over anchor which is fixed to the vehicle at the appropriate location. Such an anchor typically projects approximately 15 to 20 millimeters above the surface of the vehicle interior and has a mushroom-shaped or T-shaped head around which the loop or cord is passed.

It is known for tie-down anchors to be secured in the desired position on a surface of the vehicle by engaging a threaded bolt or stud which projects from the surface. Such studs are typically on the order of 4 to 8 millimeters in diameter. One type of known anchor has a threaded hole or a captive nut on its lower surface so that it may be threaded into engagement with the stud. This has the drawback of requiring that the anchor be rotated either by hand or by a power tool to thread it onto the stud. Threading the anchor onto the stud by hand is time consuming and labor intensive. The use of a power tool adds costs for both procurement and maintenance of the tool.

It has therefore been found advantageous to use a tie-down anchor that may be pushed straight onto the stud and which engages the threads without requiring that the anchor be rotated. This has been achieved by barbs which project radially inward into a hole in the bottom the anchor to engage the threads of the stud when the stud is inserted therein. The barbs are angled toward the top of the anchor and are flexible so that they deflect outwardly as the stud is inserted into the hole and spring back so that the tips of the barbs engage the threads in a ratcheting effect and prevent the stud from being withdrawn from the hole. The anchor may be removed only by twisting it to unthread it from the stud, in the manner of a conventional threaded nut.

One known push-on anchor, depicted in FIG. 1, comprises a mushroom portion 100 having upper and lower radial flanges 102,104 for retaining a loop 106 when it is passed therearound, and a separately formed thread engagement tube 108 having barbs 110 of the type described hereinabove disposed radially about its interior. The mushroom 100 and the thread engagement tube 108 are snapped into engagement with one another, a cylinder 112 formed on the bottom of the mushroom fitting downwardly into the upper end of the thread engagement tube, and detent prongs 114 projecting outwardly through windows 116 in the tube to hold the two portions together. The mushroom has a blind, unthreaded hole 118 extending upwardly into it from the lower surface of the cylinder for receiving the top end of the stud when the anchor is mounted thereon.

The two portions of the prior art push-on anchor must be molded separately because to form it as a single piece would require that the barbs be molded on the interior of the blind hole extending into the anchor. This is impractical when using conventional injection molding technology, unless removable cores or some other cost-adding technology is applied. The molding of the anchor as two separate pieces and subsequent assembly of the pieces adds significantly to the price of manufacturing the prior art push-on anchor. It would therefore be desirable to produce a push-on anchor as a single, integrally molded unit in order to reduce manufacturing costs.

SUMMARY OF THE INVENTION

It is an objective of this invention to provide a push-on anchor that is more economical to manufacture than previously known push-on anchors. It is a further objective to provide a push-on anchor that may be manufactured in a single, integral piece by an injection molding process.

These objectives are achieved by an anchor having a tubular stem defining an axial through hole for receiving a threaded stud, and means integral with the stem and projecting into the through hole for engaging the threads as the stud is urged into the through hole. The through hole in the anchor allows the thread engagement means to be molded integrally with the stem using simple injection molding techniques, thereby allowing the anchor to be produced as a single, integral piece requiring no further assembly before it is installed in connection with a threaded stud.

According to a further feature of the invention, the means for engaging the threads of the stud comprises a plurality of barbs extending radially inward into the through hole and angled along the axis of the through hole in the direction in which the stud is inserted therein. The barbs are sufficiently thin and flexible to be easily deflected radially outward as the stud is inserted into the through hole, thereby allow the stud to pass between the barbs. The tips of the barbs engage the threads in a ratcheting manner as the stud is inserted into the through hole. The angled barbs are easily molded and provide a positive grip on the stud to effectively prevent its withdrawal from the through hole unless the anchor is rotated to unthread it from the stud in the manner of a conventional threaded nut.

According to a further feature of the invention, the anchor comprises means integral with the stem and projecting therefrom into the through hole for contacting the stud to maintain the stud centered within the through hole. In a preferred embodiment of the invention, the centering means comprises a plurality of axially extending ridges spaced about the circumference of the through hole and defining therebetween a diameter approximately equal to the outside diameter of the stud. When the anchor is engaged with the stud, the ridges contact the outer surface of the stud along substantially the entire length of the stem to provide a secure and stable engagement between the components.

According to yet another feature of the invention, the anchor has first and second flanges extending radially outward from the stem and spaced apart by an axial distance sufficient to receive therebetween an item to be engaged by the anchor.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view of a prior art push-on anchor;

FIG. 2 is a perspective view of an anchor according to the present invention;

FIG. 3 is a top view of the invention anchor;

DETAILED DESCRIPTION OF THE PREFERRED EMBODIMENT

Figure 4:
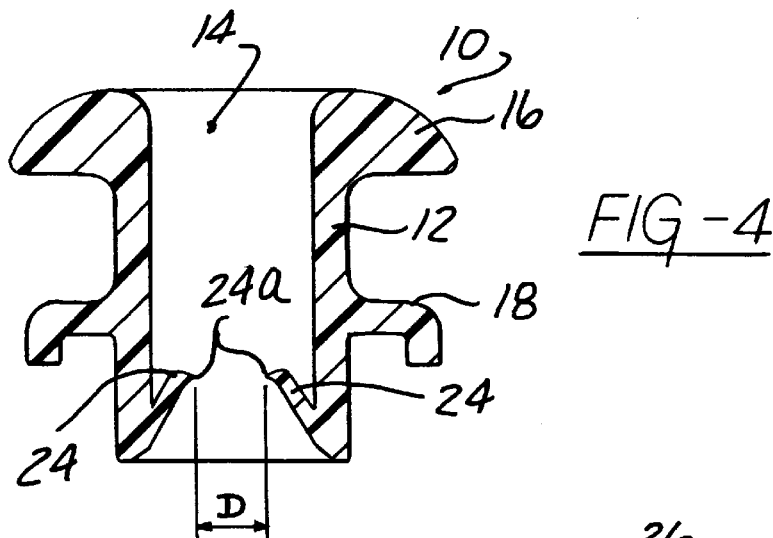
FIG. 4 is a cross section view taken along line 4—4 of FIG. 3.
Figure 5:
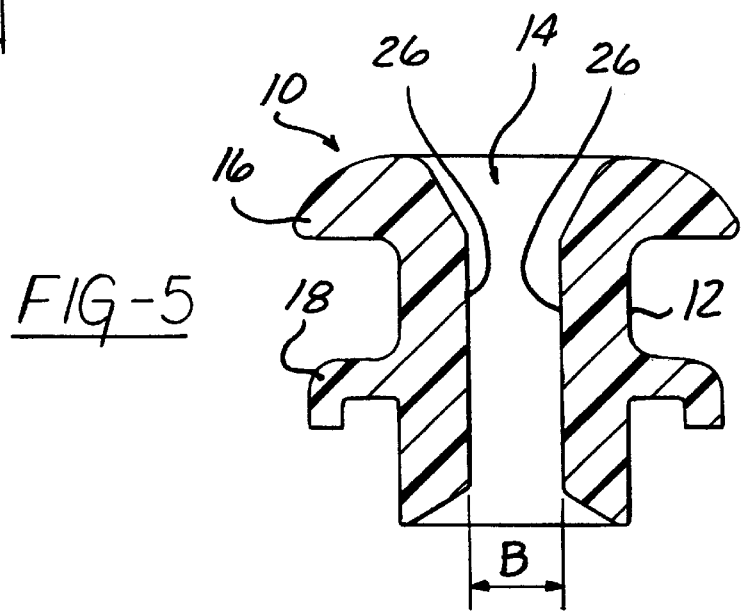
FIG. 5 is a cross section view taken along line 5—5 in FIG. 3.

As seen in FIGS. 2–5, a push-on anchor 10 according to the present invention comprises a tubular stem 12 having an axial through hole 14, a first retaining flange 16 extending radially outward from the stem adjacent an upper end thereof, and a second flange 18 extending radially outward from the stem at approximately a mid-point thereof. The anchor 10 is formed as a single, integral piece, preferably of a high strength plastic such as ABS, and preferably by an injection molding process. The anchor 10 is adapted for mating engagement with a stud 20 having conventional threads 22 formed on its outer surface. The anchor 10 is used to secure a cord, a strap, a section of netting or some other flexible member to a surface from which the stud projects.

A plurality of barbs 24 are formed on the interior surface of the stem 12 adjacent the lower end thereof. Four barbs spaced 90° are shown in the preferred embodiment, but any number may be provided. The barbs 24 project radially inward into the through hole 14 and are angled toward the top of the anchor 10, as best seen in FIG. 4. In the preferred embodiment, the barbs 24 are angled approximately 30° with respect to the axis of the stem 12, but this angle may vary depending upon the thread pattern of the stud 20 and other design factors.

The tip 24a of each barb has a sharp, triangular point directed radially inward. The barb tips 24a are shaped to closely match the dimensions of the threads 22 of the stud 20 which the anchor 10 is designed to engage. As best seen in FIG. 3, the tips 24a of the barbs 24 are concave when viewed along the axis of the stem 12 and define a minimum internal diameter D within the interior of the through hole 14. This minimum internal diameter D is designed to be slightly smaller than the diameter of the roots of the threads 22 on the stud 20.

A plurality of alignment ridges 26 extend axially along substantially the entire length of the inner surface of the through hole 14. The ridges 26 are evenly spaced around the circumference thereof and are offset from the barbs 24. As best seen in FIG. 3, the inner surfaces of the ridges 26 are concave and define a diameter B within the through hole 14 which is slightly greater than the maximum outside diameter of the stud 20.

To secure the invention anchor 10 to the stud 20, the anchor 10 is placed over and in coaxial alignment with the stud 20 and urged straight downwardly so that the stud 20 passes into the through hole 14 from below. Since the minimum inner diameter A defined by the barbs 24 is smaller than the outside diameter of the stud 20, the stud contacts the undersides of the barbs 24 and deflects them radially outward and allow the stud to pass upwardly therebetween.

The barbs 24 are relatively thin in cross section (see FIG. 4) and are able to flex outwardly without breaking as the anchor 10 is urged downwardly over the stud 20. As the stud 20 is inserted, the barb tips 24a engage one rows of threads 22 after the other in a ratcheting fashion, snapping inwardly by virtue of their own elasticity so that the barbs 24 are engaged with the threads 22 at substantially all times. When the barbs 24 are engaged with the threads 22, the stud 20 is effectively restrained against being withdrawn from the through hole 14 unless the anchor 10 is rotated with respect to stud 20 so that the anchor is unscrewed from the threads 22 in the manner of a conventional nut.

When the stud 20 is within the through hole 14, the alignment ridges 26 contact the stud 20 to keep it centered within the through hole 14. This makes the anchor 10 much more stable and secure when it is installed over the stud 20, since the barbs 24 only grip the stud 20 adjacent the lower end of the anchor 10. The ridges 26 are necessary because the through hole 14 must be oversized with respect to the outside diameter of the stud 20 to allow the barbs 24 to be molded.

In the preferred embodiment of the invention anchor 10, a plurality of circumferentially spaced scallops 28 are formed in the outer edge of the upper flange 16. The radius of the scallops 28 is preferably slightly greater than the radius of the cord, loop or other member which is intended to be attached to the anchor 10. The scallops 28 assist in keeping the loop beneath the upper flange 16 when the cord is pulled upwardly, along the axis of the anchor 10. When subjected to such an upward pulling, the cord forming the loop may begin to stretch and slip upward around the edge of the flange 16. When this occurs, the cord slides into two adjacent scallops 28 and continued upward tension on the cord causes the loop to become more tightly engaged with the scallops 28, thereby preventing the loop from being pulled completely off of the anchor 10.

Figure 6:
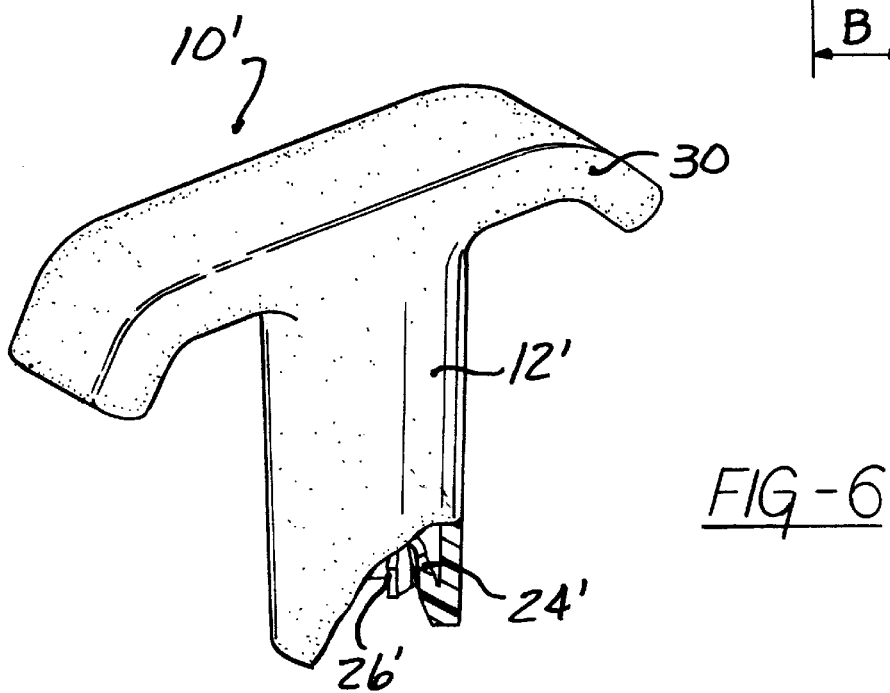
FIG. 6 is a perspective view of an alternative embodiment of an anchor according to the present invention.

FIG. 6 depicts an alternative embodiment of the invention anchor 10'. Anchor 10' has a stem 12' having barbs 24' and alignment ridges 26' generally similar to those described and depicted in relation to the first embodiment described hereinabove, but differs from the first embodiment in its external configuration. The anchor 10' has a T-shaped head 30 instead of a circular upper flange. Such a T-shaped head is well adapted to retain a loop when a tension force is applied to the cord at an angle of greater than 45° from horizontal. Although the anchor 10' is shown with no lower flange, it may also have a lower flange similar to that shown in the first embodiment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A push-on anchor for mating engagement with a stud having an outer surface and threads formed thereon, the anchor comprising a stem having a retaining flange extending radially outward adjacent a first end thereof, an axial hole for receiving the stud, and means extending within the stem for engaging the threads as the stud is urged into the hole from a second end of the stem and resisting withdrawal of the stud from the second end of the stem, the anchor characterized in that:

the anchor is formed as an integral unit and the axial hole extends completely through the anchor, whereby the engaging means may be formed by a conventional injection molding process, and wherein the engaging means comprises a plurality of barbs extending radially inward into the through hole and angled axially toward the first end of the stem, the barbs deflectable radially outward to allow the stud to pass therebetween as the stud is urged into the through hole from the second end of the stem.

2. A one-piece, push-on anchor for mating engagement with a stud having an outer surface and threads formed thereon, the anchor comprising:

a tubular stem defining an axial through hole for receiving the stud and having integral retaining means extending radially outward from the stem adjacent a first end thereof for attaching an article to be secured to the anchor; and means, integral with the stem and projecting therefrom into the through hole, for engaging the threads as the stud is urged into the through hole from a second end thereof and for resisting withdrawal of the stud from the second end of the stem, wherein the means for engaging the threads comprise a plurality of barbs extending radially inward into the through hole and angled axially toward the first end of the stem, the barbs deflectable radially outward to allow the stud to pass therebetween as the stud is urged into the through hole from the second end of the stem.

3. The anchor according to claim 2 further comprising:

means integral with the stem and projecting therefrom into the through hole for contacting the stud to maintain the stud centered within the through hole.

4. A one-piece, push-on anchor for mating engagement with a stud having an outer surface and threads formed thereon, the anchor comprising:

a tubular stem defining an axial through hole for receiving the stud and having integral retaining means extending radially outward from the stem adjacent a first end thereof for attaching an article to be secured to the anchor;

means integral with the stem and projecting therefrom into the through hole for engaging the threads as the stud is urged into the through hole from a second end thereof and for resisting withdrawal of the stud from the second end of the stem; and means integral with the stem and projecting therefrom into the through hole for contacting the stud to maintain the stud centered within the through hole, wherein the means for contacting the stud comprises a plurality of alignment ridges extending axially along an inner surface of the stem and defining therebetween a diameter approximately equal to an outside diameter of the stud.

5. The anchor according to claim 2 wherein the retaining means comprises a generally circular flange.

6. The anchor according to claim 5 wherein the flange has at least three scallops formed in an outer circumferential edge thereof at evenly spaced intervals.

7. The anchor according to claim 5 wherein the retaining means further comprises a second generally circular flange spaced axially from the first flange.

8. A one-piece, push-on anchor for mating engagement with a stud having an outer surface and threads formed thereon, the anchor comprising:

a tubular stem defining an axial through hole for receiving the stud and having an integral retaining flange extending radially outward adjacent a first end thereof;

a plurality of barbs integral with the stem and projecting therefrom radially inward into the through hole and angled axially toward the first end of the stem, the barbs deflectable radially outward to allow the stud to pass therebetween as the stud is urged into the through hole from a second end of the stem, and having tips for engaging the threads to resist withdrawal of the stud from the second end of the stem; and a plurality of alignment ridges extending axially along an inner surface of the stem and defining therebetween a diameter approximately equal to an outside diameter of the stud.

* * * * *